(12) United States Patent
Fan et al.

(10) Patent No.: US 9,794,363 B2
(45) Date of Patent: *Oct. 17, 2017

(54) METHOD AND APPARATUS FOR SENDING A PUSH CONTENT

(71) Applicant: HUAWEI TECHNOLOGIES CO.,LTD., Shenzhen, Guangdong (CN)

(72) Inventors: Shunan Fan, Beijing (CN); Guoqiao Chen, Beijing (CN); Lei Wang, Beijing (CN); Ting Dong, Shenzhen (CN); Huiping Zhang, Shenzhen (CN); Jian Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/247,406

(22) Filed: Aug. 25, 2016

(65) Prior Publication Data
US 2016/0366235 A1 Dec. 15, 2016

Related U.S. Application Data

(60) Continuation of application No. 14/298,356, filed on Jun. 6, 2014, now Pat. No. 9,444,901, which is a (Continued)

(30) Foreign Application Priority Data

Sep. 21, 2007 (CN) .......................... 2007 1 0154667

(51) Int. Cl.
*G06F 15/16* (2006.01)
*H04L 29/08* (2006.01)
(Continued)

(52) U.S. Cl.
CPC ............ *H04L 67/26* (2013.01); *H04L 12/189* (2013.01); *H04L 12/1859* (2013.01);
(Continued)

(58) Field of Classification Search
CPC ...... H04L 67/26; H04L 65/1006; H04W 4/12; H04W 72/048
(Continued)

(56) References Cited

U.S. PATENT DOCUMENTS 6,047,327 A * 4/2000 Tso ..................... G06F 17/3087
707/E17.116
6,311,058 B1 10/2001 Wecker et al.
(Continued)

FOREIGN PATENT DOCUMENTS

CN 1529966 A 9/2004
CN 1750673 A 3/2006
(Continued)

OTHER PUBLICATIONS

OMA-TS-SIP_Push-V0_10_0-20070910-D,Open Mobile Alliance, dated Sep. 10, 2007, total 48 pages.
(Continued)

*Primary Examiner* — Frantz Jean
(74) *Attorney, Agent, or Firm* — Huawei Technologies Co., Ltd.

(57) ABSTRACT

A terminal receiving a push message is provided. The terminal receives a push message sent by a server, determines that the push message matches a service that the terminal is allowed to receive according to a service control condition which specifies application identifiers (app IDs) corresponding to services that the terminal is allowed to receive. The terminal then performs a service processing corresponding to the received push message.

11 Claims, 7 Drawing Sheets

801 — Compare the push message with a matching condition in the preset push message control policy 802 — Process the push message according to a processing mode corresponding to the matching condition that is satisfied by the push message

Related U.S. Application Data division of application No. 13/686,493, filed on Nov. 27, 2012, now Pat. No. 8,788,608, which is a continuation of application No. 12/729,052, filed on Mar. 22, 2010, now Pat. No. 8,335,831, which is a continuation of application No. PCT/CN2008/072393, filed on Sep. 17, 2008.

(51) Int. Cl.
*H04L 12/18* (2006.01)
*H04L 29/06* (2006.01)
*H04W 4/12* (2009.01)
*H04W 72/04* (2009.01)

(52) U.S. Cl.
CPC .......... *H04L 65/1006* (2013.01); *H04W 4/12* (2013.01); *H04W 72/048* (2013.01)

(58) Field of Classification Search
USPC ...................................... 709/206, 207; 726/4
See application file for complete search history.

(56) References Cited

U.S. PATENT DOCUMENTS

| | | |
|---|---|---|
| 7,415,284 B2 | 8/2008 | Hoover et al. |
| 7,418,256 B2 | 8/2008 | Kall et al. |
| 8,000,712 B2 | 8/2011 | Gisby et al. |
| 8,131,281 B1 | 3/2012 | Hildner et al. |
| 2002/0133568 A1 | 9/2002 | Smith et al. |
| 2004/0237109 A1 | 11/2004 | Laitinen et al. |
| 2004/0254993 A1 | 12/2004 | Mamas |
| 2006/0168642 A1 | 7/2006 | Tachizawa et al. |
| 2006/0179115 A1 | 8/2006 | Garcia-Martin et al. |
| 2006/0230154 A1 | 10/2006 | Nguyenphu et al. |
| 2007/0180037 A1 | 8/2007 | Cheng et al. |
| 2008/0068995 A1* | 3/2008 | Skog ........................ H04L 29/06 370/230.1 |
| 2008/0075009 A1 | 3/2008 | Picard |
| 2008/0291829 A1 | 11/2008 | Hammar |
| 2009/0258633 A1* | 10/2009 | Kim .................... H04L 12/5855 455/412.2 |
| 2012/0214521 A1 | 8/2012 | Preston et al. |
| 2013/0086158 A1 | 4/2013 | Fan et al. |

FOREIGN PATENT DOCUMENTS

| | | |
|---|---|---|
| CN | 1874233 A | 12/2006 |
| CN | 1925654 A | 3/2007 |
| CN | 1946202 A | 4/2007 |
| CN | 1949770 A | 4/2007 |
| CN | 1997009 A | 7/2007 |
| CN | 101079710 A | 11/2007 |
| CN | 101136837 A | 3/2008 |
| WO | 02069585 A2 | 9/2002 |
| WO | 03038637 A1 | 5/2003 |

OTHER PUBLICATIONS

Open Mobile Alliance,OMA-WAP-TS-PushOTA-V2_1-20051122-C,Push Over the Air,Candidate Version 2.1—Nov. 22, 2005,total 46 pages.

* cited by examiner

METHOD AND APPARATUS FOR SENDING A PUSH CONTENT

CROSS-REFERENCE TO RELATED APPLICATIONS

This application is a continuation of U.S. patent application Ser. No. 14/298,356, filed Jun. 6, 2014, which is a division of U.S. patent application Ser. No. 13/686,493, filed Nov. 27, 2012, now U.S. Pat. No. 8,788,608, The U.S. patent application Ser. No. 13/686,493 is a continuation of U.S. patent application Ser. No. 12/729,052, filed Mar. 22, 2010, now U.S. Pat. No. 8,335,831, The U.S. patent application Ser. No. 12/729,052 is a continuation of International Patent Application No. PCT/CN2008/072393, filed Sep. 17, 2008, which claims priority to Chinese Patent Application No. 200710154667.7, filed on Sep. 21, 2007, all of which are hereby incorporated by reference in their entireties.

FIELD

The present disclosure relates to a content distribution technology, and more particularly to a method and apparatus for sending a push content.

BACKGROUND

"Push" is a content distribution mechanism, which employs a client/server operation mode and requires a server to distribute the required content without requiring a client to send a specific request. "Push" is most frequently used in message notification systems, and is applied in various industries such as security, banking, and business website. Taking the field of mobile value-added services as an example, the push service has the following applications: user customized information, which mainly refers that a user designates a subscription condition through initiative subscription or operation, and a content provider actively sends proper information to the user according to the corresponding subscription condition; group send information, which refers to a content push initiated by a third party without initiative subscription from the user, and may be specifically sending focused advertisements for stores, or sending group information notification according to actual conditions; and point-to-point service, which refers that a certain user sends designated content to another user.

A structure for realizing a push application is mainly formed by the following three parts: a push proxy gateway (PPG), a push initiator (PI), and a terminal. The PI is an initiator of a push message, which is an application running on an ordinary website server and communicates with the PPG through a push access protocol (PAP). The PPG mainly functions to process a push submission and operations associated with the submission and transfers a push content to the terminal. Services of the PPG include: identification and authentication of the PI, access control, resolution and error detection of the push content and control information, address resolution of an acceptor of the push content, including broadcast, multicast, and other functions, and communication with the terminal through a push Over The Air (OTA) protocol.

Briefly, the push realizing process is described as follows. The PI initiates a push message, which indicates a receiving terminal, the source PI, and a push content of the push message. The PI sends the push message to the PPG through the PAP. Then, the PPG sends the push message to the terminal through the push OTA protocol. FIG. 1 is a schematic view of realizing a push application in the prior art.

A session initiation protocol (SIP) is a control (signaling) protocol in an application layer, which is adapted to establish, modify, and terminate a call between Internet Protocol (IP) network-based users. The actual applications of the SIP in practice include, but not limited to, speech, video, instant message, and the like. An SIP push service is a service for encapsulating a push content in an SIP message and transferring the SIP message over an existing SIP/IP core network. FIG. 2 is a schematic view of realizing an SIP push service in the prior art. As shown in FIG. 2, the part accomplishing the functions of the PPG in the push service may be referred to as a push sending agent, while the part accomplishing the functions of the terminal in the push service may be referred to as a push receiving agent. The push sending agent and the push receiving agent are interface points of the SIP/IP core network and communicate with each other by using an SIP message. In the SIP push service, the functions provided by the SIP include: accessibility of a user, availability of the user, capability of the user, and session establishment and session management. The SIP/IP core network provides abundant end-to-end media sessions and sessions between a client and a server. The SIP/IP core network includes an SIP gateway and a registration server, and provides authentication and authorization access services for SIP clients and SIP services, and may also provide SIP registration and routing functions.

FIG. 3 is a schematic structural view of a framework of the SIP push service in the prior art. A terminal includes a push receiving agent and an application module. The push receiving agent transmits a push content to the application module. The application module accomplishes the corresponding service operation based on the push content. A server includes a push sending agent and an application module. The push sending agent receives a transfer command and the push content sent by a push provider PI, and sends the push content to the push receiving agent in the terminal over the SIP/IP core network according to the transfer command. The application module in the server accomplishes the functions associated with the service in the application layer.

Currently, in the SIP push service, the user can only report his/her own terminal capability information and preference through a user agent profile (UA Prof) mechanism. The terminal capability may refer to, for example, equipment manufacturer, model, software version, screen size, screen resolution, and the like, while the preference may refer to some user-defined configuration information. The information reported by the user may be employed by the server in realizing service customization and personalization. That is, the user informs the server of services supported by him/her. The message security and authorization in the SIP push service are mainly based on a security mechanism provided by the SIP/IP core network. That is, the SIP/IP core network can perform authentication and security appraisal on the push sending agent, so as to ensure that the push sending agent corresponding to the terminal is legal, but has no control capability on the push message, for example, in the case that the user does not wish to receive a large push content, the user intends to reject some undesirable service types and a push content containing reactionary words and violent words, the user intends to reject a push content sent by a PI that is un-trusted to the terminal, or the terminal is only expected to receive a specific push content. Since no control capability on the push message is provided, the push message cannot be sent in the above specific cases, so that the user experience is degraded.

SUMMARY

An embodiment of the present invention provides a server with a push function. The server includes a processor and a non-transitory computer readable medium storing instructions executable by the processor to perform operations including: receiving a push message sent by a push message provider; determining that the push message matches a service control condition which specifies an application identifier (app ID) corresponding to a service that a terminal is allowed to receive; and thereafter, sending the push message to the terminal.

Another embodiment of the present invention provides a terminal including a processor and a non-transitory computer readable medium instructions executable by the processor. The processor performs operations including: receiving a push message sent by a server; determining that the push message matches a service that the terminal is allowed to receive according to a service control condition which specifies application identifiers (app IDs) corresponding to services that the terminal is allowed to receive; and performing a service processing corresponding to the received push message.

Yet another embodiment of the present invention provides a non-transitory computer readable medium encoded with a computer program executable by a processor to perform actions including: receiving a push message sent by a server; determining that the push message matches a service that the terminal is allowed to receive according to a service control condition which specifies application identifiers (app IDs) corresponding to services that the terminal is allowed to receive; and performing a service processing corresponding to the received push message.

DETAILED DESCRIPTION OF THE EMBODIMENTS

To make the objectives and advantages of the embodiments of the present invention more comprehensible, the embodiments of the present invention are further illustrated below in detail with reference to the accompanying drawings.

First, four kinds of devices for controlling a push message provided in the embodiments of the present invention are introduced, that is, two kinds of push sending agents and two kinds of terminals.

Figure 1:
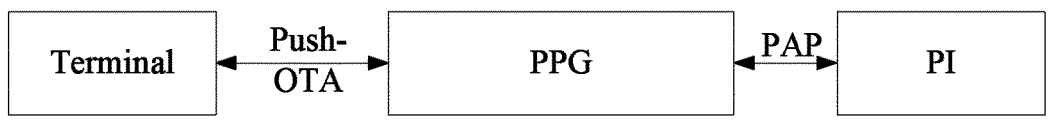
FIG. 1 is a schematic structural view of realizing a push mechanism in the prior art.
Figure 2:
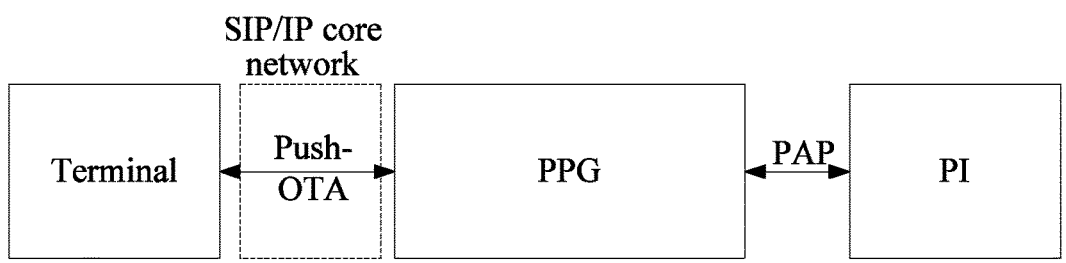
FIG. 2 is a schematic view of realizing an SIP push service in the prior art.
Figure 3:
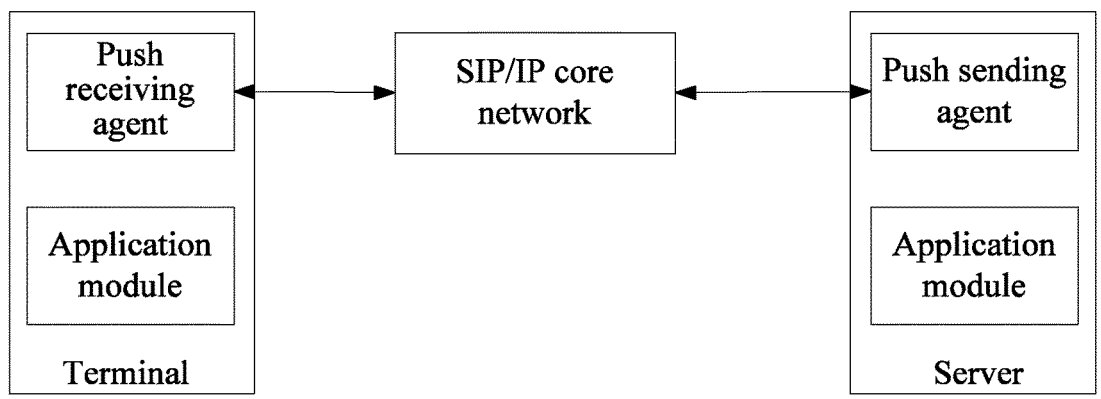
FIG. 3 is a schematic structural view of a framework of the SIP push service in the prior art.
Figure 4:
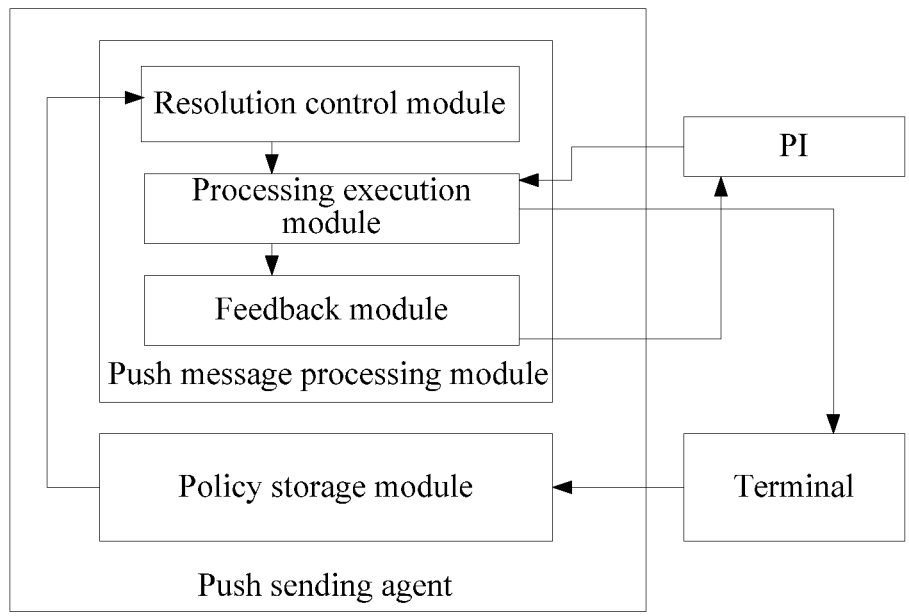
FIG. 4 is a schematic structural view of a first push sending agent according to an embodiment of the present invention.

FIG. 4 is a schematic structural view of a first push sending agent according to an embodiment of the present invention. The push sending agent includes a push message processing module and a policy storage module.

The push message processing module is adapted to receive a push message sent by a PI, compare the received push message with a matching condition in a push message control policy stored by the policy storage module, and process the received push message according to a processing mode corresponding to the matching condition that is satisfied by the push message.

The policy storage module is adapted to store the push message control policy containing the matching condition and the corresponding processing mode that is set by a terminal.

In the first push sending agent provided in the embodiment of the present invention, a push message control policy set by a terminal is stored, and when a received push message satisfies a matching condition in the push message control policy, the received push message is processed according to a processing mode corresponding to the matching condition, which realizes control of the push message, so as to enhance the user experience.

The push message processing module of the first push sending agent may include a processing execution module and a resolution control module.

The processing execution module is adapted to receive the push message sent by the PI, send the received push message to a push receiving agent in the terminal when the matching condition is a push content that the terminal is allowed to receive, drop the push message or forward the push message to other terminals when the matching condition is a push content that the terminal is not allowed to receive, and temporarily store the push message when the matching condition is a push content that the terminal is currently not allowed to receive according to a resolution control result obtained by the resolution control module.

The resolution control module is adapted to resolve the push message control policy stored by the policy storage module, and compare the push message received by the processing execution module with the matching condition in the push message control policy to determine the matching condition that is satisfied by the push message, so as to obtain the resolution control result.

The push message processing module may further include a feedback module, adapted to feed back a success message to the PI when the processing execution module sends the push message to the push receiving agent in the terminal;

and feed back a failure message to the PI when the processing execution module drops the push message, forwards the push message to other terminals, or temporarily stores the push message.

The first push sending agent provided in the embodiment of the present invention is applicable to the case that a push sending agent stores a push message control policy set by a terminal, and uses the stored push message control policy when controlling a push message.

Figure 5:
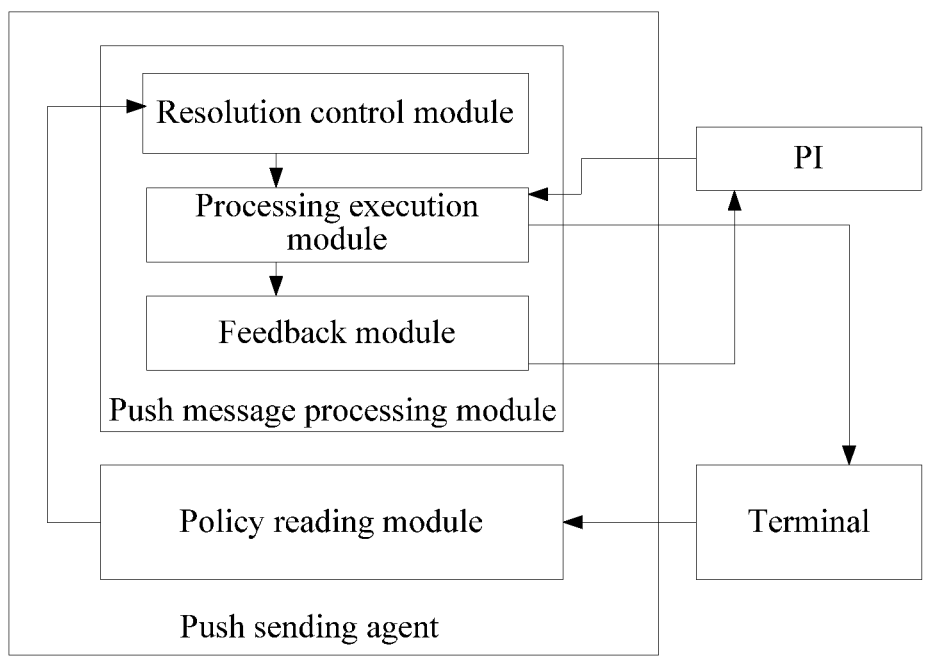
FIG. 5 is a schematic structural view of a second push sending agent according to an embodiment of the present invention.

FIG. 5 is a schematic structural view of a second push sending agent according to an embodiment of the present invention. The push sending agent includes a push message processing module and a policy reading module.

The push message processing module is adapted to receive a push message sent by a PI, compare the received push message with a matching condition in a push message control policy read by the policy reading module, and process the received push message according to a processing mode corresponding to the matching condition that is satisfied by the push message.

The policy reading module is adapted to read the push message control policy containing the matching condition and the corresponding processing mode from a terminal.

In the second push sending agent provided in the embodiment of the present invention, a push message control policy set by a terminal is read, and when a received push message satisfies a matching condition in the push message control policy, the received push message is processed according to a processing mode corresponding to the matching condition, which realizes control of the push message, so as to enhance the user experience.

The push message processing module of the second push sending agent may include a processing execution module and a resolution control module.

The processing execution module is adapted to receive the push message sent by the PI, send the received push message to a push receiving agent in the terminal when the matching condition is a push content that the terminal is allowed to receive, drop the push message or forward the push message to other terminals when the matching condition is a push content that the terminal is not allowed to receive, and temporarily store the push message when the matching condition is a push content that the terminal is currently not allowed to receive according to a resolution control result obtained by the resolution control module.

The resolution control module is adapted to resolve the push message control policy read by the policy reading module, and compare the push message received by the processing execution module with the matching condition in the push message control policy to determine the matching condition that is satisfied by the push message, so as to obtain the resolution control result.

The push message processing module may further include a feedback module, adapted to feed back a success message to the PI when the processing execution module sends the push message to the push receiving agent in the terminal; and feed back a failure message to the PI when the processing execution module drops the push message, forwards the push message to other terminals, or temporarily stores the push message.

The second push sending agent provided in the embodiment of the present invention is applicable to the case that a terminal sets and stores a push message control policy, and a push sending agent reads the push message control policy from the terminal when controlling a push message.

Figure 6:
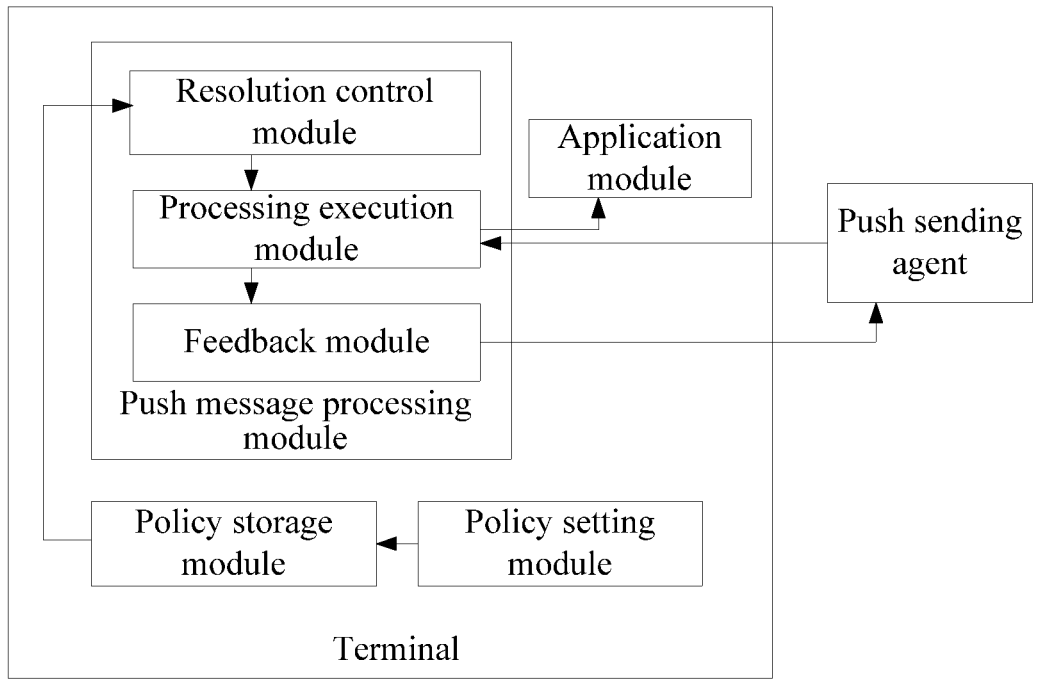
FIG. 6 is a schematic structural view of a first terminal according to an embodiment of the present invention.

FIG. 6 is a schematic structural view of a first terminal according to an embodiment of the present invention, which includes a policy setting module, a policy storage module, and a push message processing module.

The policy setting module is adapted to set a push message control policy containing a matching condition and a corresponding processing mode.

The policy storage module is adapted to store the push message control policy set by the policy setting module.

The push message processing module is adapted to receive a push message sent by a push sending agent, compare the received push message with the matching condition in the push message control policy stored by the policy storage module, and process the received push message according to the processing mode corresponding to the matching condition that is satisfied by the received push message.

In the first terminal provided in the embodiment of the present invention, a push message control policy is set and stored, and when a received push message satisfies a matching condition in the push message control policy, the received push message is processed according to a processing mode corresponding to the matching condition, which realizes control of the push message, so as to enhance the user experience.

The first terminal provided in the embodiment of the present invention may further include an application module adapted to perform corresponding service processing according to the push message. In this case, the push message processing module includes a processing execution module and a resolution control module.

The processing execution module is adapted to receive the push message sent by the push sending agent, send the push message to the application module in the terminal when the matching condition is a push content that the terminal is allowed to receive, drop the push message or forward the push message to other terminals when the matching condition is a push content that the terminal is not allowed to receive, and temporarily store the push message when the matching condition is a push content that the terminal is currently not allowed to receive according to a resolution control result obtained by the resolution control module.

The resolution control module is adapted to resolve the push message control policy in the policy storage module, and compare the push message received by the processing execution module with the matching condition in the push message control policy stored by the policy storage module to determine the matching condition that is satisfied by the push message, so as to obtain the resolution control result.

The push message processing module may further include a feedback module, adapted to feed back a success message to the push sending agent when the processing execution module sends the push message to the application module; and feed back a failure message to the push sending agent when the processing execution module drops the push message, forwards the push message to other terminals, or temporarily stores the push message.

The first terminal provided in the embodiment of the present invention is applicable to the case that a terminal sets and stores a push message control policy and uses the stored push message control policy to control a push message.

Figure 7:
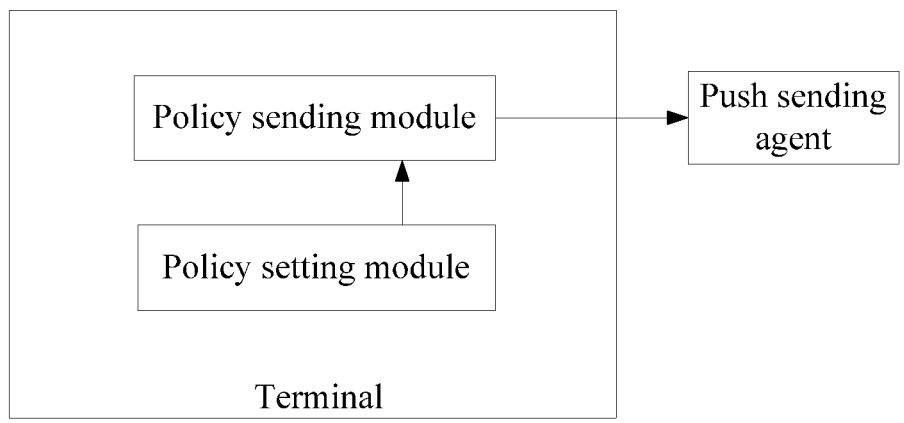
FIG. 7 is a schematic structural view of a second terminal according to an embodiment of the present invention.

FIG. 7 is schematic structural view of a second terminal according to an embodiment of the present invention, which includes a policy setting module and a policy sending module.

The policy setting module is adapted to set a push message control policy containing a matching condition and a corresponding processing mode.

The policy sending module is adapted to send the push message control policy set by the policy setting module to a push sending agent.

In the second terminal provided in the embodiment of the present invention, a push message control policy is set and then sent to a push sending agent, such that the push sending agent performs control on a push message according to the push message control policy sent by the terminal after receiving the push message, which realizes control of the push message, so as to enhance the user experience.

The terminal provided in the embodiment of the present invention is applicable to the case that a terminal sets a push message control policy, but a push sending agent controls a push message according to the push message control policy sent by the terminal.

The above push sending agents and terminals provided in the embodiments of the present invention may form systems for controlling a push message in the embodiments of the present invention. The first push sending agent and the second terminal provided in the embodiments of the present invention may form a first system provided in an embodiment of the present invention; the first terminal in the embodiment of the present invention and an ordinary push sending agent that only accomplishes a function of transmitting a push message may form a second system provided in an embodiment of the present invention; and the second push sending agent in the embodiment of the present invention and a terminal that only accomplishes a function of setting a push message control policy may form a third system provided in an embodiment of the present invention.

Next, a method for controlling a push message provided in an embodiment of the present invention is introduced.

Figure 8:
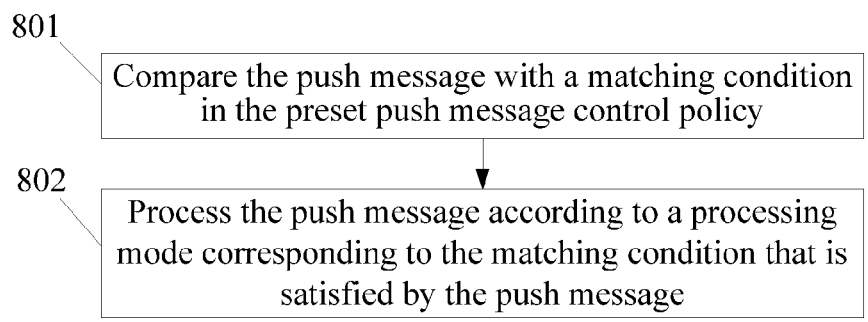
FIG. 8 is a flow chart of a method for controlling a push message according to an embodiment of the present invention.

FIG. 8 is a flow chart of a method for controlling a push message according to an embodiment of the present invention. A push message control policy is set before the process starts. The process includes the following blocks.

In Block 801, the push message is compared with a matching condition in the push message control policy.

In this block, the push message control policy may be submitted by a user.

In Block 802, the push message is processed according to a processing mode corresponding to the matching condition that is satisfied by the push message.

In the method for controlling a push message provided in the embodiment of the present invention, a push message control policy is set, and when a push message satisfies a matching condition in the push message control policy, the push message is processed according to a processing mode corresponding to the matching condition, which realizes control of the push message, so as to enhance the user experience.

Based on the devices for controlling a push message provided in the embodiments of the present invention, the method for controlling a push message provided in the embodiment of the present invention may have two embodiments. The two embodiments are introduced below together with a specific SIP push service.

Before the specific preferred embodiments are introduced, specific examples of a matching condition in a push message control policy applied in the two embodiments are listed as follows.

The matching conditions in the set push message control policy may include: a user identifier (ID), a maximum message length threshold, service control, content control, and control of trusted PIs. The corresponding five push message control policies are respectively introduced below.

First, User ID

The setting of this matching condition aims at determining that a terminal to which a push message is to be sent is a terminal that sets a push message control policy according to the user ID when a push sending agent controls the push message.

Second, Maximum Message Length Threshold

A content length of a push message is controlled in such push message control policy. Specifically, a terminal sets a length of a push message and stores the set length in the terminal or sends the set length to a push sending agent for storage. When a length of a received push message exceeds the set length, the terminal is always or currently not allowed to receive the push message, and the push message may be automatically dropped, transferred to other terminals, or temporarily stored with reference to the stored push message control policy.

Third, Service Control

A service received by a terminal is controlled, which is mainly realized by setting a service ID corresponding to a service type that the terminal is allowed, not allowed, or currently not allowed to receive. A push sending agent may send a push message sent from a PI to a push receiving agent in the terminal through an SIP message, in which an Accept-Contact header in the SIP message indicates the service type.

If a push message control policy is stored in the terminal, a list of service types that the terminal does not wish to receive or currently does not wish to receive or a list of services that the terminal wishes to receive may be defined, and the terminal accomplishes the control of the service type to select to drop the push message, send the push message to other terminals, or temporarily store the push message.

Figure 9:
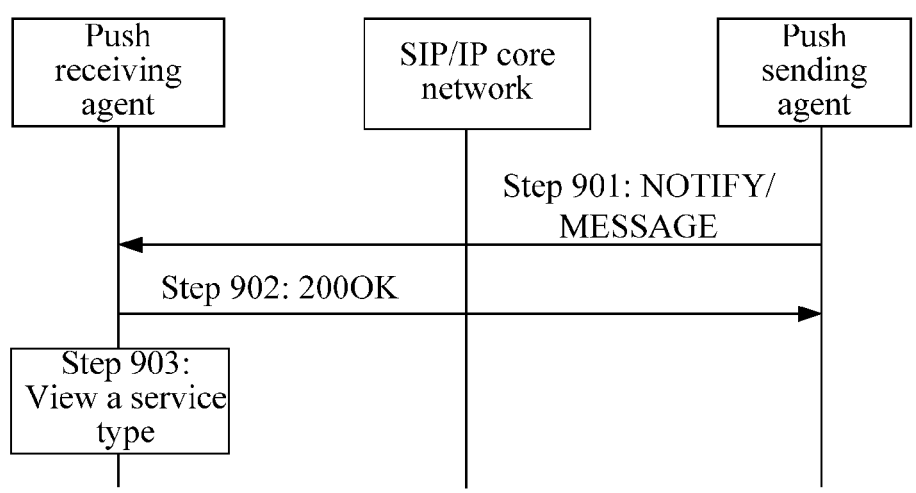
FIG. 9 is a flow chart of a processing operation performed by a terminal according to a push message control policy.

FIG. 9 is a flow chart of a processing operation performed by a terminal according to a push message control policy. It is assumed that a service type of a push message is a multimedia message in this process. The process includes the following steps.

In Step 901, after receiving a push message sent by a PI, a push sending agent sends the push message to a push receiving agent through NOTIFY or MESSAGE in an SIP message.

In Step 902, after receiving the push message, the push receiving agent returns a 200OK message to the push sending agent to notify the push sending agent that the push message has been successfully received.

In Step 903, the push receiving agent views a service type carried in an Accept-Contact header field in the SIP message that carries the push message, and determines that the push message is a multimedia message. If the terminal is not allowed to receive a service message of a multimedia message in the push message control policy, the push receiving agent drops the push message without sending the push message to an application module, so that the user does not know the arrival of the message; if the terminal is currently not allowed to receive the multimedia message service in the push message control policy, the push receiving agent temporarily stores the push message; and if the terminal is allowed to receive the service message of the multimedia message in the push message control policy, the push message is sent to the application module for performing corresponding service processing.

If the push message control policy is sent to the push sending agent for storage, a list of services that the terminal is not allowed to receive or currently not allowed to receive or a list of services that the terminal is allowed to receive may be defined similarly, and the push sending agent accomplishes the control of the service type to select to drop the push message, send the push message to other terminals, or temporarily store the push message. In this case, besides being indicated in the Accept-Contact header field in the SIP message encapsulated by the push sending agent, the service type of the push message may also be determined according to a receiving port number of the push sending agent or a source port address of the PI.

Figure 10:
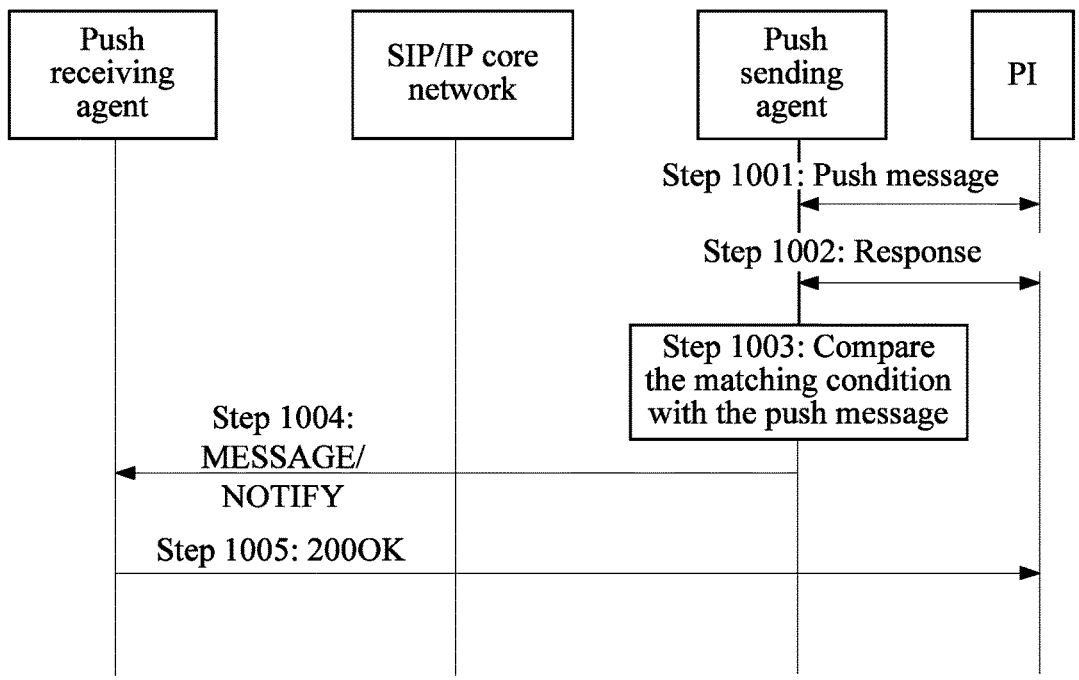
FIG. 10 is a flow chart of a processing operation performed by a push sending agent according to a push message control policy.

FIG. 10 is a flow chart of a processing operation performed by a push sending agent according to a push message control policy. The process includes the following steps.

In Step 1001, a PI sends a push message to the push sending agent.

In Step 1002, the push sending agent sends a response to the PI.

In Step 1003, the push sending agent compares the push message with a matching condition in the stored push message control policy, and if the matching condition satisfied by the push message is a push content that a terminal is allowed to receive, Step 1004 is performed; otherwise, if the matching condition satisfied by the push message is a push content that the terminal is not allowed to receive, the push message is dropped; and if the matching condition satisfied by the push message is a push content that the terminal is currently not allowed to receive, the push message is temporarily stored.

In Step 1004, the push sending agent sends the push message to a push receiving agent through MESSAGE or NOTIFY in an SIP message.

In Step 1005, the push receiving agent returns a 200OK message to the push sending agent.

Fourth, Content Control

A terminal may set a content key word of a push message that is not allowed or currently not allowed to be received, for example, reactionary characters, violent characters, advertisement characters, unhealthy characters, politically sensitive characters, and the like.

The terminal may also set a content key word of a push message that is allowed to be received. For example, a push message containing key words about finance and economics, news, and sports is allowed to be received, and a push message not containing such key words is not received.

Fifth, Trusted PI

A terminal may set an ID of a trusted PI. Once a push message is received, if a PI sending the push message is a trusted PI, the push message is allowed to be received.

Table 1 shows examples of specific matching conditions set in the push message control policy. In the actual application, the valid time may also be set for the matching conditions.

TABLE 1

| Specification definition | Parameter or description | Processing method | Valid time | Value |
|---|---|---|---|---|
| User ID | User ID | | | sip:alice@sample.com |
| Maximum Message Size | Maximum message length threshold | Drop/pause | 9:00-11:00 | 1300 bytes |
| App ID | Service ID | Drop/pause/store | 9:00-11:00 | MMS service: x-wap-application:mms.ua |
| Feature Tag | Service ID | Drop/pause/store | 9:00-11:00 | MMS service: +g.oma.iari.push.mms.ua |

TABLE 1-continued

| Specification definition | Parameter or description | Processing method | Valid time | Value |
|---|---|---|---|---|
| Content Filter | Content key word | Drop | 00:00-00:00 | Reactionary characters, violent characters, advertisements, and the like |
| Whitelist | Trusted PI | Drop/pause | 00:00-00:00 | www.yahoo.com |

First Embodiment

Figure 11:
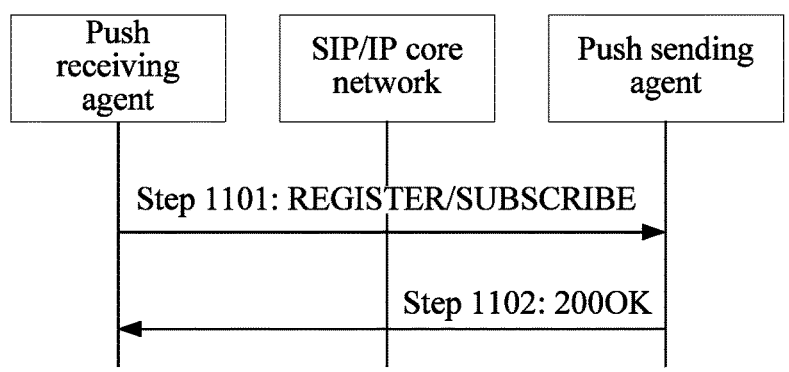
FIG. 11 is a flow chart of sending a push message control policy from a terminal to a push sending agent.

A terminal sets a push message control policy and sends the set push message control policy to a push sending agent on a server for storage. After a PI sends a push message to the push sending agent, the push sending agent processes the push message according to the stored push message control policy. FIG. 11 shows a specific process of sending the set push message control policy from the terminal to the push sending agent, that is, the terminal sends the push message control policy to the push sending agent by encapsulating the push message control policy in an SIP message. The process shown in FIG. 11 includes the following steps.

In Step 1101, after setting the push message control policy, the terminal carries the push message control policy in a REGISTER or SUBSCRIBE request message and sends the request message to the push sending agent for storage.

In Step 1102, after receiving the push message control policy, the push sending agent returns a 200OK message to the terminal, which indicates that the push message control policy has been successfully received and stored.

The REGISTER or SUBSCRIBE request message is a specific example of the SIP message. Other SIP messages may also be adopted to carry the push message control policy. The specific carrying manner may include carrying the push message control policy in an SIP header field of an SIP push message. Moreover, the carrying the push message control policy in the SIP message is also a specific application in combination with an SIP push service. In other services besides the SIP push service, other messages may also be adopted to carry the push message control policy, which is associated with the specific application environment.

Extensible markup language (XML) is a set of rules for creating semantic tags that divide a document into many elements and identify the elements, which is a platform-independent method for describing data. Briefly, the data created by using XML can be read by any application on any platform. In the embodiments of the present invention, the push message control policy may be created by using XML and carried in the SIP message in the format of an XML document.

Three examples of carrying the push message control policy in the SIP message are introduced below.

In the first example, the push message control policy is carried in a ua-profile header field of an event in a SUBSCRIBE message. The specific SUBSCRIBE message structure is shown as follows. The message structure is a common sense for those skilled in the art, and thus is illustrated briefly herein.

SUBSCRIBE sip:receiver agent@home1.net SIP/2.0; Message name
Via:SIP/2.0/UDP[5555::aaa:bbb:ccc:ddd]:1357; comp=sigcomp;branch=z9hG4bKnashds7;
Path where the message passes through
Max-Forwards: 70; Hop that the message passes through
Route: <sip:pcscf1.visited1.net:7531;lr;comp=sigcomp>, <sip:orig@scscf1.home1.net;lr>; Designated route information
From: <sip:receiver agent@home1.net>;tag=31415; Message source
To: <sip:reveiver agent@home1.net>; Message destination
Accept-Contact:*;+g.oma.icsi.push';+g.oma.iari.push.PushSyncML;;require;explicit; Content that can be received
Event: ua-profile;profile-type="application"; Event, in which the push message control policy is carried in the ua-profile header field in the event
Call-ID: b89rjhnedlrfjflslj40a222; Session number
CSeq: 85 SUBSCRIBE; Transaction sequence
P-Preferred-Identity: "Receiver agent"<sip:reveiver agent@home1.net>; Terminal that wishes to accept
Privacy: none
Expires: 600000; Time limit
Accept: application/vnd.syncml.ds.notification; Content format
Contact: <sip:[5555::aaa:bbb:ccc:ddd]:1357; comp=sigcomp>; Contact address
Content-Length: 0; Content length The specific push message control policy is carried in the format of an XML document, the structure of which is shown as follows. The XML document structure is a common sense for those skilled in the art, and is introduced briefly herein.

In the second example, the push message control policy is carried in Accept header field and Content-type of a SUBSCRIBE message. The specific SUBSCRIBE message structure is shown as follows. The meanings of various parts are not described again.
SUBSCRIBE sip:receiver agent@home1.net SIP/2.0
Via:SIP/2.0/UDP[5555::aaa:bbb:ccc:ddd]:1357; comp=sigcomp;branch=z9hG4bKnashds7
Max-Forwards: 70
Route: <sip:pcscf1.visited1.net:7531;lr;comp=sigcomp>, <sip:orig@scscf1.home1.net;lr>
From: <sip:receiver agent@home1.net>;tag=31415
To: <sip:reveiver agent@home1.net>
Accept-Contact: *;+g.oma.icsi.push';+g.oma.iari.push.PushSyncML;;require;explicit
Event: ua-profile;profile-type="application"
Call-ID: b89rjhnedlrfjflslj40a222
CSeq: 85 SUBSCRIBE
P-Preferred-Identity: "Receiver agent"<sip:reveiver agent@home1.net>
Privacy: none
Expires: 600000
Accept: application/filterlist+xml; The Accept header field identifies that the push message control policy is carried in the format of an XML document.
Content-type: application/filterlist+xml; The push message control policy in the format of the XML document is carried in the Content-type header field.
Contact: <sip:[5555::aaa:bbb:ccc:ddd]:1357; comp=sigcomp>
Content-Length: 0

The specific push message control policy is carried in the format of the XML document, the structure of which is shown as follows.

```
<?xml version="1.0" encoding="UTF-8"?>
<rdf:RDF           xmlns:rdf="http://www.w3.org/1999/02/22-rdf-syntax-ns#"
xmlns:prf="http://www.openmobilealliance.org/tech/profiles/UAPROF/ccppschema-20021212#" xmlns:mms="http://www.wapforum.org/profiles/MMS/ccppschema-20010111#">
-<prf:component>
-<rdf:Description rdf:ID="Filterlist">
<rdf:type
rdf:resource="http://www.openmobilealliance.org/tech/profiles/UAPROF/ccppschema-20021212#filterlist" />; The above is the specification of the current XML document.
<prf:User_ID>a@example.com</prf:User_ID>; User ID
<prf:MaxMessageSize>1500</prf:MaxMessageSize>; Maximum content length value
<prf:Sevice_ID_Drop>; Service ID for indicating a service type, in which a push message
conforming to the service type is dropped.
<rdf:Bag>
        <rdf:li> x-wap-application:sms.ua </rdf:li>; Short message service
        <rdf:li> x-wap-application:sms.ua </rdf:li>; Multimedia short message service
    </rdf:Bag>
</prf:Sevice_ID_Drop >
<prf:Content_Drop>; Content key word, in which a push message containing such content
key word is dropped.
<rdf:li> reactionary </rdf:li>; Specific key word
<rdf:li> violent </rdf:li>; Specific key word
</rdf:Bag>
</prf:Content_Drop >
    <prf:PI_Permitted>; ID of a PI, in which a push message from the PI is permitted.
     -<rdf:Bag>
            <rdf:li> www.example1.com </rdf:li>; ID of a specific trusted PI
            <rdf:li> www.example2.com </rdf:li>; ID of a specific trusted PI
        </rdf:Bag>
    </prf:PI_Permitted>
</rdf:Description>
  </prf:component>
</rdf:RDF>
```

```xml
<?xml version="1.0" encoding="UTF-8"?>
<!-- edited with XMLSPY v5 rel. 4 U (http://www.xmlspy.com) by Registred (Registred)
-->
<!DOCTYPE Filters SYSTEM "C:\Documents and Settings\user\desktop\filters.dtd">; The
above is the specification of the current XML document format.
<Filters>
    <Filter Filter_Item="APP_ID" Pro_Methord="Drop">; Service ID for indicating a
service type, in which a push message containing the service ID is dropped.
        <User_ID>a@example.com</User_ID>; User ID
        <Filter_Value>mms</Filter_Value>; The specific service type is a multimedia
message service.
        <Run_Time>00:00-00:00</Run_Time>; Valid time
    </Filter>
    <Filter Filter_Item="APP_ID" Pro_Methord="Pause"> Service ID for indicating a
service type, in which the sending of a push message containing the service ID is paused.
        <User_ID>a@example.com</User_ID>; User ID
        <Filter_Value>email</Filter_Value>; The specific service type is an E-mail service.
        <Run_Time>18:00-5:00</Run_Time>; Valid time
    </Filter>
    <Filter Filter_Item="Key_Words" Pro_Methord="Drop"> Indicating a key word, in
which a push message containing the key word is dropped.
        <User_ID>a@example.com</User_ID>; User ID
        <Filter_Value> violent </Filter_Value>; Specific key word
        <Run_Time>00:00-00:00</Run_Time>; Valid time
    </Filter>
    <Filter Filter_Item="Max_Size" Pro_Methord="Drop">; Indicating a maximum content
length, in which a push message exceeding the length is dropped.
        <User_ID>a@example.com</User_ID>; User ID
        <Filter_Value>1500</Filter_Value>; Specific maximum content length value
        <Run_Time>00:00-00:00</Run_Time>; Valid time
    </Filter>
    <Filter Filter_Item="PI" Pro_Methord="Permitted">; ID of a PI, in which a push
message containing the ID of the PI is permitted.
        <User_ID>a@example.com</User_ID>; User ID
        <Filter_Value>sina.com.cn</Filter_Value>; Specific ID of the PI
        <Run_Time>18:00-5:00</Run_Time>; Valid time
    </Filter>
</Filters>
```

In the third example, a header field carrying the push message control policy is extended in an SIP push message. Three extended header fields may be adopted to carry the push message control policy.

The first extended header field is SIP-Push-Trusted-List, which extends the existing SIP header field and is adapted to carry the push message control policy. Certainly, the header field can also carry other SIP service-based control policies. Several specific realizing manners and rules are illustrated below through examples.

SIP-Push-Trusted-List: <sip: alice@sample.com>
SIP-Push-Trusted-List<sip:bob@sample.com>
SIP-Push-Trusted-List: <www.sample.com>
SIP-Push-Trusted-List: 13612345678

The permitted object in the header field is mainly an ID of a PI, which may be a host name, a telephone number, or a uniform resource identifier (URI) of the SIP.

The second extended header field is SIP-Push-Block-List for carrying a push message type required to be dropped in the SIP push service. Certainly, the header field may also carry other SIP service-based drop messages. Several specific realizing manners and rules are illustrated below through examples.

SIP-Push-Block-List: <sip: alice@sample.com>, App_ID=x-wap-application:mms.ua, Max=1800 bytes,Content="reactionary"
SIP-Push-Block-List: <sip:bob@sample.com>
SIP-Push-Block-List: <www.sample.com>
SIP-Push-Block-List: 13612345678

The dropped object in the above header field may be an ID of a PI. Alternatively, a multimedia message service may be dropped according to an indication in the APP_ID, a push message larger than 1800 bytes may be dropped according to the specification of the Max field, or a push message having reactionary content may be dropped according to the Content field.

The third extended header field is SIP-Push-Permit-List for carrying a push message control policy associated with the SIP push service. Certainly, the header field may also carry other SIP service-based control policies. Several specific realizing manners and rules are illustrated below through examples.

SIP-Push-Permit-List: <sip:alice@sample.com>, App_ID=x-wap-application:mms.ua,Max=1800 bytes, permit=allow,
SIP-Push-Permit-List: <sip: bob@sample.com>, permit=allow
SIP-Push-Permit-List: www.sample.com,permit=refuse
SIP-Push-Permit-List: 13612345678,permit=refuse In the above header field, the permitted object may be an ID of a PI, the service type required to be allowed is a multimedia message service indicated in the APP_ID, and a push message smaller than 1800 bytes is allowed according to the specification of the Max field. The authorization right is accomplished by the permit attached field.

A completed SIP message may be formed by the extended header fields provided in the embodiment of the present invention together with relevant header fields in other SIP messages.

Figure 12:
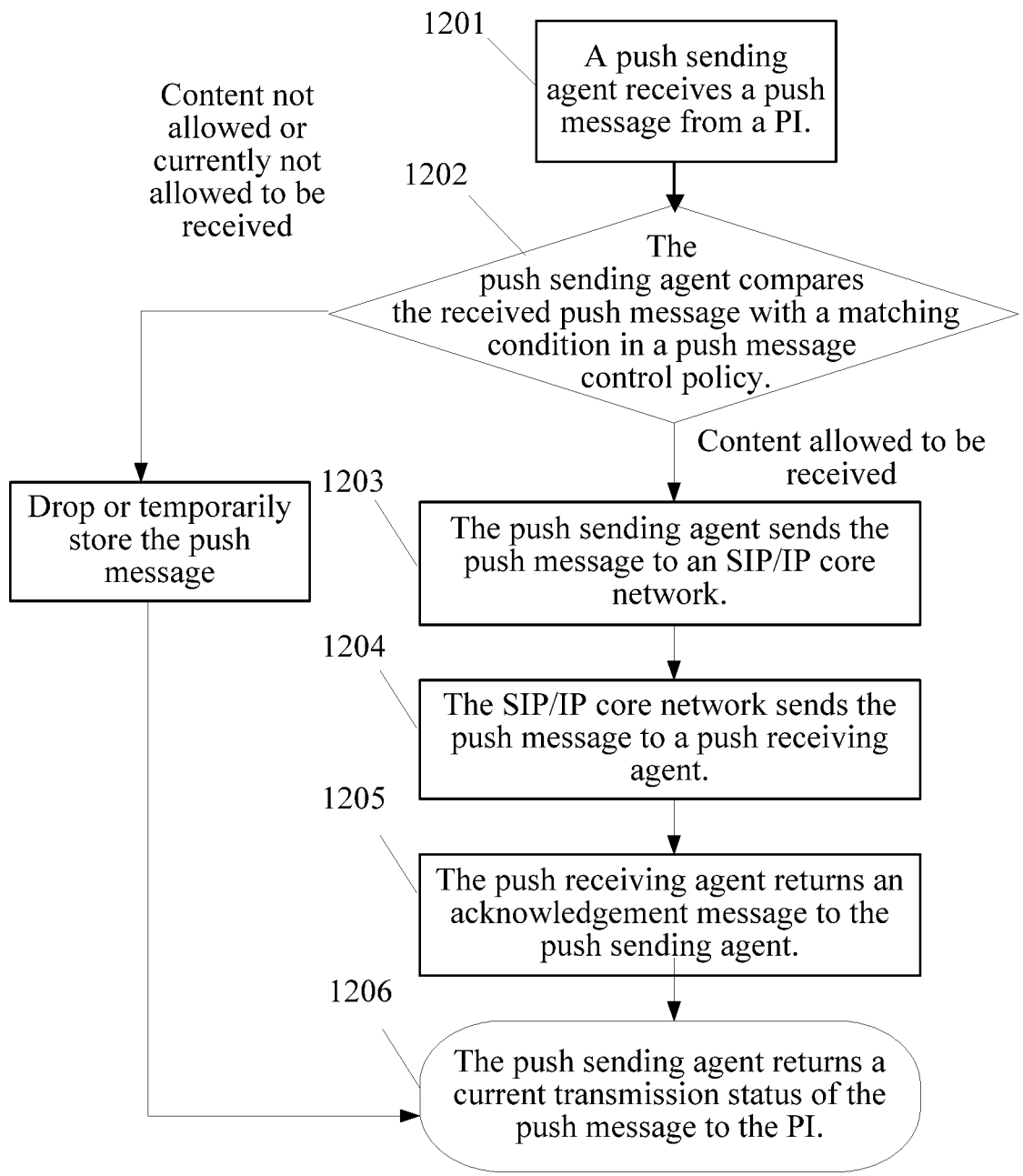
FIG. 12 is a flow chart of a first method for controlling a push message according to an embodiment of the present invention.

In the first embodiment, the control processing is performed on a received push message according to the process shown in FIG. 12 after Steps 1101 and 1102 shown in FIG. 11. The process shown in FIG. 12 includes the following blocks.

In Block 1201, a push sending agent receives a push message from a PI.

In Block 1202, the push sending agent compares the received push message with a matching condition in a push message control policy to determine, for example, whether the push message has an excessively large content, whether the push message contains a key word that is not wished to be received, whether the push message is a service not wished to be received currently, whether the push message is from a trusted PI, whether the current time is a time at which the push message is wished or not wished to be received, whether the set push message control policy is applied, and the like. If the matching condition satisfied by the push message is a push content that the terminal is allowed to receive, Block 1203 is performed; otherwise, if the matching condition satisfied by the push message is a push content that the terminal is not allowed to receive, the push sending agent drops the push message; and if the matching condition satisfied by the push message is a push content that the terminal is currently not allowed to receive, the push sending agent temporarily stores the push message, and Block 1206 is directly performed after the operation of dropping or temporarily storing the push message is finished.

In Block 1203, the push sending agent sends the push message to an SIP/IP core network. The specific sending manner includes carrying the push message in an SIP message and sending the SIP message to the SIP/IP core network by the push sending agent.

In Block 1204, the SIP/IP core network sends the push message to a push receiving agent.

In Block 1205, the push receiving agent returns an acknowledgement message to the push sending agent.

In Block 1206, the push sending agent returns a current transmission status of the push message to the PI. In this block, if the push sending agent sends the push message to the push receiving agent, a success message is returned to the PI; and if the push sending agent drops or temporarily stores the push message, a failure message is returned to the PI.

Second Preferred Embodiment

Figure 13:
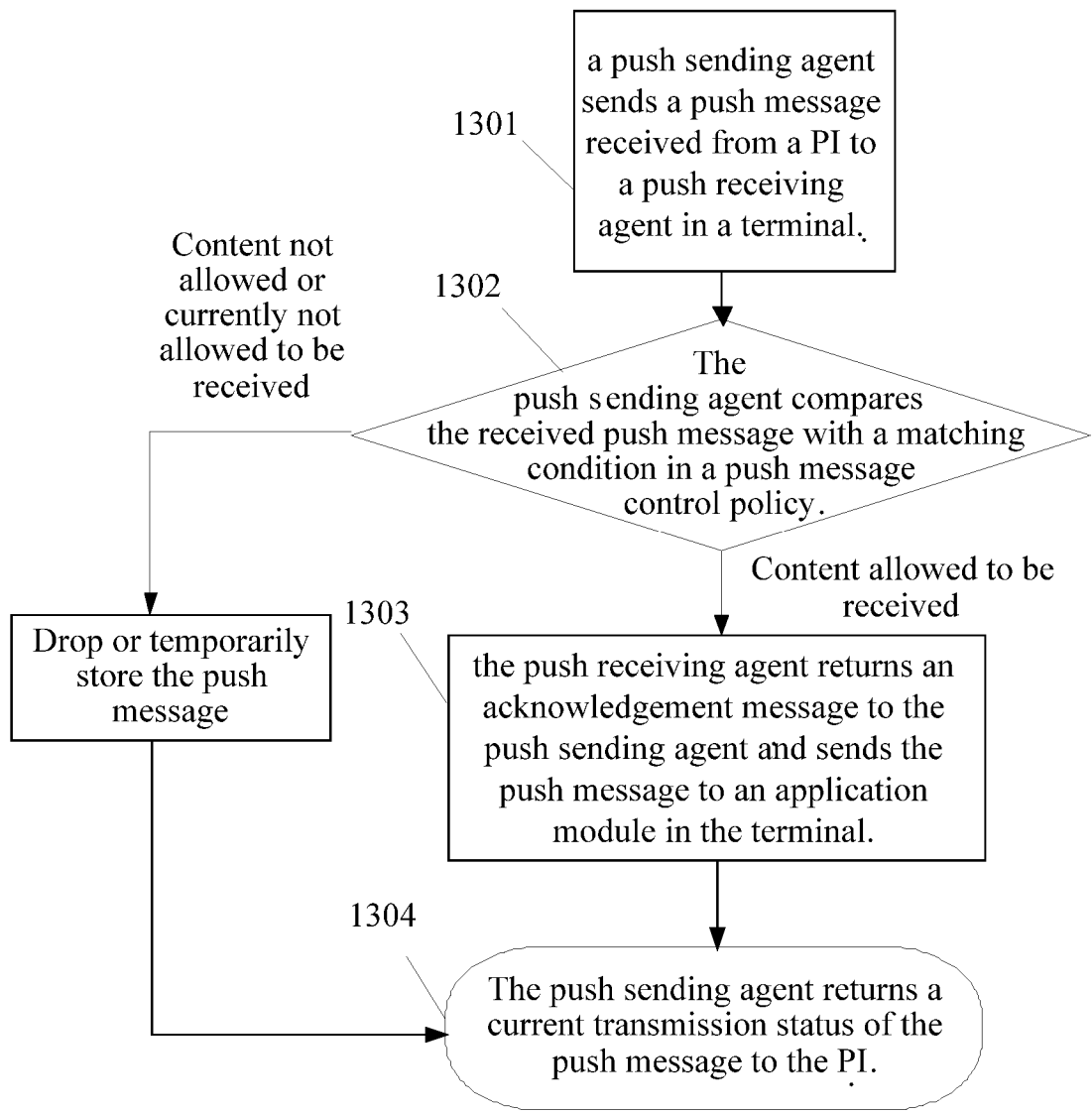
FIG. 13 is a flow chart of a second method for controlling a push message according to an embodiment of the present invention.

A terminal sets a push message control policy and stores the set push message control policy locally. After a PI sends a push message to a push sending agent, the push sending agent sends the push message to the terminal, and the terminal processes the push message according to the stored push message control policy. FIG. 13 shows a process of processing the received push message by the terminal. The process includes the following blocks.

In Block 1301, a push sending agent sends a push message received from a PI to a push receiving agent in a terminal. The specific sending manner may include carrying the push message in a header field of an SIP message and sending the SIP message to the push receiving agent by the push sending agent.

In Block 1302, the push receiving agent compares the received push message with a matching condition in a push message control policy to determine, for example, whether the push message has an excessively large content, whether the push message contains a key word that is not wished to be received, whether the push message is a message that is not wished to be received currently, whether the push message is from a trusted PI, and the like. If the matching condition satisfied by the push message is a push content that the terminal is allowed to receive, Block 1303 is performed; otherwise, if the matching condition satisfied by the push message is a push content that the terminal is not allowed to receive, the push receiving agent drops the push message; and if the matching condition satisfied by the push message is a push content that the terminal is currently not allowed to receive, the push receiving agent temporarily stores the push message, and Block 1304 is directly performed after the operation of dropping or temporarily storing the push message is finished. The push receiving agent may also return a message that the push message has been deleted to the push sending agent when dropping or temporarily storing the push message before directly performing Block 1304. This block is optional.

In Block 1303, the push receiving agent returns an acknowledgement message to the push sending agent and sends the push message to an application module in the terminal for performing corresponding service.

In Block 1304, the push sending agent reports a current transferring status of the push message to the PI. In this block, if the push receiving agent sends the push message to the application module in the terminal, a success message is returned to the PI; and if the push receiving agent drops or temporarily stores the push message and returns the message that the push message has been deleted to the push sending agent, the push sending agent returns a failure message to the PI.

The push message control policies provided in the embodiments of the present invention all need to be converted into a format that can be received by the push sending agent or stored by the terminal. The push message control policy may be stored and sent in the format of an XML document as mentioned in the above embodiments. A framework structure of an XML document including matching conditions and processing modes that can be set in the above five types of push message control policies is further given below. The specific statement structure is a common sense for those skilled in the art, and will not be described herein again. The push message control policy may be formed by filling the specific matching condition and processing mode according to the document structure, and other actually required matching conditions and processing modes may also be extended based on such document structure.

```
<?xml version="1.0" encoding="UTF-8"?>
<!--W3C Schema generated by XMLSPY v5 rel. 4 U (http://www.xmlspy.com)-->
<xs:schema         xmlns:xs="http://www.w3.org/2001/XMLSchema"
elementFormDefault="qualified">; The above is the specification of the XML document.
    <xs:element name="Filter">
        <xs:complexType>
            <xs:sequence>
                <xs:element ref="User_ID" maxOccurs="unbounded"/>; User ID
                <xs:element ref="Filter_Value" maxOccurs="unbounded"/>; Specific
matching condition can be filled, for example, service ID, specific key word, or the like
                <xs:element ref="Run_Time" maxOccurs="unbounded"/>; Valid time
```

-continued

```
    </xs:sequence>
    <xs:attribute name="Filter_Item" use="required">
      <xs:simpleType>
        <xs:restriction base="xs:NMTOKEN">
          <xs:enumeration value="Key_Words"/>; Key word
          <xs:enumeration value="PI"/>; ID of an PI
          <xs:enumeration value="Feature_Tag"/>; Feature tag, for
identifying, for example, services
          <xs:enumeration value="Max_Size"/>; Maximum message
length
          <xs:enumeration value="APP_ID"/>; Service ID
        </xs:restriction>
      </xs:simpleType>
    </xs:attribute>
    <xs:attribute name="Pro_Methord" use="required">
      <xs:simpleType>
        <xs:restriction base="xs:NMTOKEN">
          <xs:enumeration value="Pause"/>; Pause
          <xs:enumeration value="Save"/>; Save
          <xs:enumeration value="Permitted"/>; Permit
          <xs:enumeration value="Drop"/>; Drop
        </xs:restriction>
      </xs:simpleType>
    </xs:attribute>
  </xs:complexType>
</xs:element>
<xs:element name="Filter_Value" type="xs:string"/>; The type of the specific matching
condition that can be filled is a string type.
<xs:element name="Filters">
  <xs:complexType>
    <xs:sequence>
      <xs:element ref="Filter" maxOccurs="unbounded"/>
    </xs:sequence>
  </xs:complexType>
</xs:element>
<xs:element name="Run_Time" type="xs:string"/>; The type of the valid time is string.
<xs:element name="User_ID" type="xs:string"/>; The type of the user ID is string.
</xs:schema>
```

In the method, the device, and the system for controlling a push message provided in the embodiments of the present invention, a push message control policy containing a matching condition and a corresponding processing mode is set, and when a received push message satisfies the matching condition in the push message control policy, the received push message is processed according to the processing mode corresponding to the matching condition, thereby realizing control of the push message, so as to enhance the user experience.

The above descriptions are merely preferred embodiments of the present invention, but are not intended to limit the scope of the present invention. Any modification, equivalent replacement, or improvement made without departing from the spirit and principle of the present invention fall within the scope of the present invention as recited in the accompanying claims.

What is claimed is:

1. A server with a push function, comprising:
a processor; and
a non-transitory computer readable medium storing instructions executable by the processor to perform operations comprising:
receiving a push message sent by a push message provider;
determining that the push message matches a service control condition which specifies an application identifier (app ID) corresponding to a service that a terminal is allowed to receive; and
sending the push message to the terminal when the push message matches the service control condition.

2. The server according to claim 1, wherein the push message is a short message, and the service control condition specifies the app ID corresponding to a short message service (SMS) that the terminal is allowed to receive.

3. The server according to claim 1, wherein the push message is a multimedia message, and the service control condition specifies the app ID corresponding to a multimedia message service (MMS) that the terminal is allowed to receive.

4. A terminal, comprising:
a processor; and
a non-transitory computer readable medium storing instructions executable by the processor to perform operations comprising:
receiving a push message sent by a server;
determining that the push message matches a service that the terminal is allowed to receive according to a service control condition which specifies application identifiers (app IDs) corresponding to services that the terminal is allowed to receive; and
performing a service processing corresponding to the received push message.

5. The terminal according to claim 4, wherein the push message is a short message, and the service control condition specifies the app ID corresponding to a short message service (SMS) that the terminal is allowed to receive.

6. The terminal according to claim 4, wherein the push message is a multimedia message, and the service control condition specifies the app ID corresponding to a multimedia message service (MMS) that the terminal is allowed to receive.

7. The terminal according to claim 4, further comprising:
setting the service control condition internally.

8. The terminal according to claim 4, further comprising:
receiving the service control condition from the server.

9. A non-transitory computer readable medium encoded with a computer program executable by a processor to perform actions comprising:
receiving a push message sent by a server;
determining that the push message matches a service that the terminal is allowed to receive according to a service control condition which specifies application identifiers (app IDs) corresponding to services that the terminal is allowed to receive; and
performing a service processing corresponding to the received push message.

10. The non-transitory computer readable medium according to claim 9, wherein the actions further comprising:
setting the service control condition internally.

11. The terminal according to claim 9, wherein the action further comprising:
receiving the service control condition from the server.

\* \* \* \* \*